F. MARTELL.
PROTECTIVE SHIELD FOR HORSE COLLARS.
APPLICATION FILED APR. 24, 1907.

919,906.

Patented Apr. 27, 1909.

Witnesses
G. R. Thomas
John Powers

Inventor
Frank Martell
By Chandler & Chandler
Attorneys

UNITED STATES PATENT OFFICE.

FRANK MARTELL, OF CROOKSTON, MINNESOTA, ASSIGNOR OF ONE-HALF TO BENJAMIN CLEMENTS, OF POLK COUNTY, MINNESOTA.

PROTECTIVE SHIELD FOR HORSE-COLLARS.

No. 919,906.  Specification of Letters Patent.  Patented April 27, 1909.

Application filed April 24, 1907. Serial No. 370,034.

*To all whom it may concern:*

Be it known that I, FRANK MARTELL, a citizen of the United States, residing at Crookston, in the county of Polk, State of Minnesota, have invented certain new and useful Improvements in Protective Shields for Horse-Collars; and I do hereby declare the following to be a full, clear, and exact description of the invention, such as will enable others skilled in the art to which it appertains to make and use the same.

This invention relates to new and useful improvements in horse collars and it has particular reference to a protective shield therefor, formed of resilient metal and in use, interposed between the outside surface of the collar proper and the hames.

Figure 1:
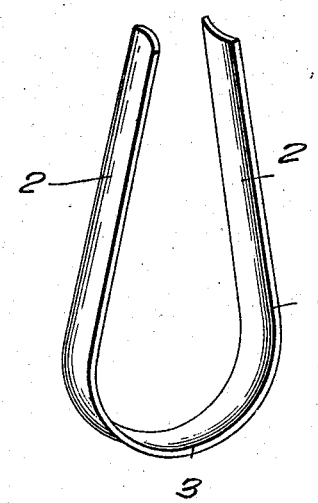
Figure 2:
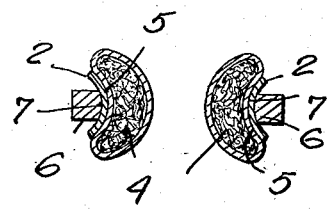

The details of construction will appear in the course of the following description, in which reference is had to the accompanying drawings forming a part of this specification, like characters of reference designating similar parts throughout the several views, wherein:

Figure 1 is a detailed perspective view of the attachment embodied in the present invention, and Fig. 2 is a horizontal sectional view showing its application to a horse collar.

The invention in its practical embodiment comprises a shield 1 constructed of resilient metal and of concavo-convex cross section as shown in Fig. 2. The attachment 1 is constituted of resilient side portions 2 which converge toward one another and of a bow-shaped connecting portion 3. Said attachment is formed to fit over the major portion of a horse collar 4 having the usual concave outer surface 5, which bears against the convex surface of the attachment 1. The hames 6 have convex inner surfaces 7, which bear against concave surfaces of the attachment 1. The several parts thus have an interfitting relation, whereby displacement of the same is positively prevented. Aside from this relation the attachment 1 has sufficient natural resiliency to frictionally bind upon the collar. The attachment 1 thus constitutes a shield to prevent the collar from breaking under the pressure of the hames, or from other causes and insures the longest possible service. Said attachment is simple in construction, inexpensive to manufacture, and practical and efficient in use.

From the foregoing description, it will be seen that simple and efficient means are provided for accomplishing the objects of the invention, but it is to be understood that the invention is susceptible of such changes as fall within the scope of the appended claim.

What is claimed is:

A shield for horse collars consisting of a metal plate of uniform width and thickness throughout, bent midway of its ends into substantially semi-circular shape to conform to the contour of the bottom of a horse-collar, the end portions of said plate from said substantially semi-circular portion being converged and of sufficient length to extend to the top of a horse-collar, said plate being concavo convex in cross section continuously from one end to the other with the convexity disposed inwardly.

In testimony whereof, I affix my signature, in presence of two witnesses.

FRANK MARTELL.

Witnesses:
JAY P. FOOTE,
LEWIS ELLINGTON.